(12) United States Patent
Paulin

(10) Patent No.: US 9,249,778 B2
(45) Date of Patent: Feb. 2, 2016

(54) VERTICAL WIND POWER GENERATOR

(75) Inventor: Daniel Paulin, Alvangen (SE)

(73) Assignee: Paulin Motor Company AB, Laguna Beach, CA (US)

( * ) Notice: Subject to any disclaimer, the term of this patent is extended or adjusted under 35 U.S.C. 154(b) by 920 days.

(21) Appl. No.: 13/350,020

(22) Filed: Jan. 13, 2012

(65) Prior Publication Data

US 2012/0195757 A1 Aug. 2, 2012

Related U.S. Application Data

(60) Provisional application No. 61/438,656, filed on Feb. 2, 2011.

(30) Foreign Application Priority Data

Feb. 2, 2011 (SE) ...................................... 1100069

(51) Int. Cl.
*F03D 7/06* (2006.01)
*F03D 3/00* (2006.01)
*F03D 3/06* (2006.01)

(52) U.S. Cl.
CPC ................ *F03D 3/005* (2013.01); *F03D 3/064* (2013.01); *F05B 2240/218* (2013.01); *F05B 2240/312* (2013.01); *F05B 2240/9151* (2013.01); *F05B 2240/9152* (2013.01); *F05B 2260/5032* (2013.01); *Y02B 10/30* (2013.01); *Y02E 10/728* (2013.01); *Y02E 10/74* (2013.01)

(58) Field of Classification Search
CPC ........... F05B 2240/21; F05B 2240/211; F05B 2240/218; F05B 2240/30; F05B 2240/302; F05B 2240/31; F05B 2240/312; F05B 2240/3121; F05B 2260/70; F05B 2260/72; F05B 2260/74; Y02E 10/74; Y02E 10/72; Y02E 10/721; F03D 3/005; F03D 3/061; F03D 3/064; F03D 7/06; F03D 7/0216; F03D 7/0208; F03D 7/0204; F03D 7/0236; F03D 7/0264; F03D 7/0268; F03D 7/041
USPC ........... 415/122.1, 124.1, 126, 128, 140, 141; 416/9, 10, 11–16, 20 A, 23, 31, 33, 34, 416/43, 51–53, 87, 88, 131, 132 R, 132 A, 416/132 B, 142, 143, 164, 166, 167, 168 R, 416/210 R, 211; 290/55, 44
See application file for complete search history.

(56) References Cited

U.S. PATENT DOCUMENTS 3,981,613 A * 9/1976 Ehrenskjold et al. .......... 416/142
4,421,458 A * 12/1983 Allan et al. .................... 416/117
(Continued)

FOREIGN PATENT DOCUMENTS

GB 2427003 A 6/2005

*Primary Examiner* — Dwayne J White
*Assistant Examiner* — Joshua R Beebe
(74) *Attorney, Agent, or Firm* — Gesmer Updegrove LLP

(57) ABSTRACT

The present invention relates to a vertical axis turbine rotor blade arrangement for a wind power generator adapted to rotate around a vertical axis. The vertical axis turbine rotor blade arrangement comprises a rotor blade having a first and a second end and being pivotally connected to a pivot arm. The pivot arm has a first and a second end and is pivotally connected to a base member. The rotor blade is adapted to be displaced between an active position and a retracted position. The base member and the pivot arm defines a horizontal plane when the rotor blade is in the active position, the base member is rotatable around a pole, the pole is configured to extend in a first direction.

20 Claims, 10 Drawing Sheets

(56) References Cited

U.S. PATENT DOCUMENTS 4,456,429 A * 6/1984 Kelland .................. 416/117
4,624,624 A * 11/1986 Yum ...................... 416/87
2005/0005562 A1* 1/2005 Henderson et al. ............ 52/633
2010/0172759 A1* 7/2010 Sullivan .......................... 416/41
2010/0209250 A1* 8/2010 Deeley .......................... 416/131
2011/0042958 A1* 2/2011 Vander Straeten .............. 290/55

* cited by examiner

VERTICAL WIND POWER GENERATOR

PRIORITY INFORMATION

The present invention claims priority to U.S. Provisional Application Ser. No. 61/438,656, filed on Feb. 2, 2011 and to Swedish Application No. 1100069-2, filed on Feb. 2, 2011, both of which are incorporated herein by reference in their entireties.

TECHNICAL FIELD

The present invention relates to a turbine rotor blade arrangement for a vertical wind power generator. The turbine rotor blade arrangement can be positioned in folded configuration to be less space consuming or less exposed to bad weather conditions.

BACKGROUND OF THE INVENTION

Vertical wind power generators are an interesting alternative to traditional horizontal axis wind turbines. Vertical wind power generators generally operate by rotating a vertical shaft to produce electrical power. As the rotating shaft is vertical, the generator and the gear box can be positioned close to the ground, or optionally on the ground. They further do not need to be actively positioned towards the wind as traditional horizontal axis wind turbines require, i.e they are omni-directional.

One example of a vertical wind power turbine is disclosed in the patent publication GB 2,427,003 A. The vertical wind power turbine comprises an upper and a lower tower section which are telescopically arranged. When the upper tower section is moved in a vertical direction it can deploy and retract turbine rotor blades. The deployment and retraction of the turbine rotor blades are effectuated by wires running along the upper and lower tower section. The wires provide for turbulence around the mast and reduce the effect of the wind power turbine. The wires also generate noise. It is an object of the present invention to provide an improved vertical axis turbine rotor blade arrangement for a wind power generator which at least provide for a useful alternative to the above mentioned solution.

SUMMARY OF THE INVENTION

It is an object of the present invention to at least provide for a useful alternative to the above mentioned solution. More specifically, the present invention relates to a vertical axis turbine rotor blade arrangement for a wind power generator adapted to rotate around a vertical axis. The vertical axis turbine rotor blade arrangement comprises a rotor blade having a first and a second end and being pivotally connected to a pivot arm. The pivot arm having a first and a second end and being pivotally connected to a base member. The rotor blade is adapted to be displaced between an active position and a retracted position. The base member and the pivot arm defining a horizontal plane when the rotor blade is in the active position. The base member further being rotatable around configured to extend in a first direction. The first end of the rotor blade is pivotally connected to the first end of the pivot arm and wherein the second end of the pivot arm is pivotally connected to the base member, so that when the rotor blade is in the active position, the rotor blade extends out and away from the plane in a direction opposite of the first direction.

According to a second aspect of the present invention, the invention relates to a vertical axis turbine rotor blade arrangement for a wind power generator adapted to rotate around a vertical axis. The turbine rotor blade arrangement comprises a rotor blade pivotally connected to a pivot arm. The pivot arm being pivotally connected to a base member adapted to rotate around the vertical axis. The rotor blade can be displaced between an active position and a retracted position. The base member comprises a displaceable member adapted to impart a torque to the pivot arm and the rotor blade simultaneously upon displacement via a torque transfer member, thereby enabling the displacement of the rotor blade between the active position and the retracted position.

The present invention provides for a vertical axis turbine rotor blade arrangement, also referred to as the rotor blade arrangement, for a wind power generator which has few moveable components. This provides for a low wind resistance. The present invention also enables a rotor blade arrangement which can raise the rotor blades above the base member and any pole attached thereto and thus reduces, or even removes, the turbulent air flow around such pole.

According to an aspect of the invention, the pivot arm comprises a rotatable elongated member having a longitudinal centre line and adapted to rotate around its longitudinal centre line for transferring a torque from the base member to the rotor blade thereby enabling the displacement of the rotor blade between the active position and the retracted position.

According to an aspect of the invention, the elongated member comprises bevel gears for transferring the torque. Bevel gears have been found to provide a simple yet robust configuration for transferring the torque. The elongated member can be a rotatable shaft, preferably a rigid shaft, or a rotatable wire, chain or the like. The rotation transfers the torque to the rotor blade and thus retains the rotor blade in a substantially vertical position during the displacement between the active position and the retracted position. This further enables the rotor blade arrangement to continue to rotate when it moves between the active position and the retracted position. It can further start to rotate substantially directly after the rotor blade leaves the retracted position and move towards the active position.

According to an aspect of the invention, at least a part of the torque transfer member is arranged inside of the pivot arm. Optionally at least a part of the rotatable elongated member is arranged inside of the pivot arm. Optionally it can be arranged on an upper or lower side of the pivot arm. However, when arranged inside of the pivot arm, the rotatable elongated member does not contribute to turbulence around the pivot arm which improves the efficiency of the rotor blade arrangement.

According to an aspect of the invention, the torque transfer member, or the rotatable elongated member, comprises a first and a second end at least one of the first and second ends, preferably both, comprises a bevel gear for transferring the torque. Bevel gears have been found to the very suitable for this purpose, providing a simple yet robust construction. In an embodiment, substantially only the bevel gears are arranged outside of the pivot arm.

According to an aspect of the invention, the pivot arm comprises a first surface fixed with respect to the pivot arm from movement and adapted to cooperate with a surface of the base member to transfer the torque. The first surface can be an integrated part of the pivot arm or be a separate material member fixedly attached to the pivot arm. The surface of the base member is displaceable. With a displaceable surface cooperating with the fixed surface, the torque can be transferred from the base member to the rotor blade, via the rotatable elongated member.

According to an aspect of the invention, the surface of the pivot arm is at least partly formed by a friction surface, a gear wheel like surface; advantageously the surface of the pivot arm is at least partly formed by a gear wheel.

According to an aspect of the invention, the surface of the pivot arm is arranged to be in working cooperation with the bevel gear at the second end of the rotatable elongated member.

According to an aspect of the invention the rotor blade has a first surface fixed with respect to the rotor blade from movement and adapted to cooperate with the rotatable elongated member to transfer the torque. The first surface of the rotor blade can be an integrated part of the rotor blade or be a separate material member fixedly attached to the rotor blade. The first surface the rotor blade is advantageously at least partly formed by a bevel gear like surface, more advantageously by a bevel gear.

According to an aspect of the invention the bevel gear of the rotor blade is arranged in working cooperation with a bevel gear at the first end of the rotatable elongated member.

According to an aspect of the invention, the base member comprises a generator. At least the displaceable member of the base member can in an embodiment be adapted to rotate around the generator, preferably is the entire base member adapted to rotate around the generator.

According to an aspect of the invention, the base member is arranged with a pole, preferably a telescopic pole. The base member can further be pivotally connected to the pole, optionally the telescopic pole.

According to an aspect of the invention, the rotor blade of the vertical axis turbine rotor blade arrangement is slightly longer than the pivot arm. This enables a small compact configuration in the retracted position. It is further very advantageous when the second end of the rotor blade comprises a winglet. The winglet reduces the turbulent air flow around the second end of the rotor blade and thus improves the efficiency of the rotor blade arrangement. In an embodiment, the winglet has an area, as seen in the first direction, which is 100% larger than the cross section of the rotor blade. Advantageously the winglet area is between 100%-1000%, preferably 200%-800% larger than the cross section of the rotor blade.

BRIEF DESCRIPTION OF THE DRAWINGS

The present invention will be described in greater detail with respect to the accompanying figures in which.

DETAILED DESCRIPTION OF PREFERRED EMBODIMENTS

Figure 1:
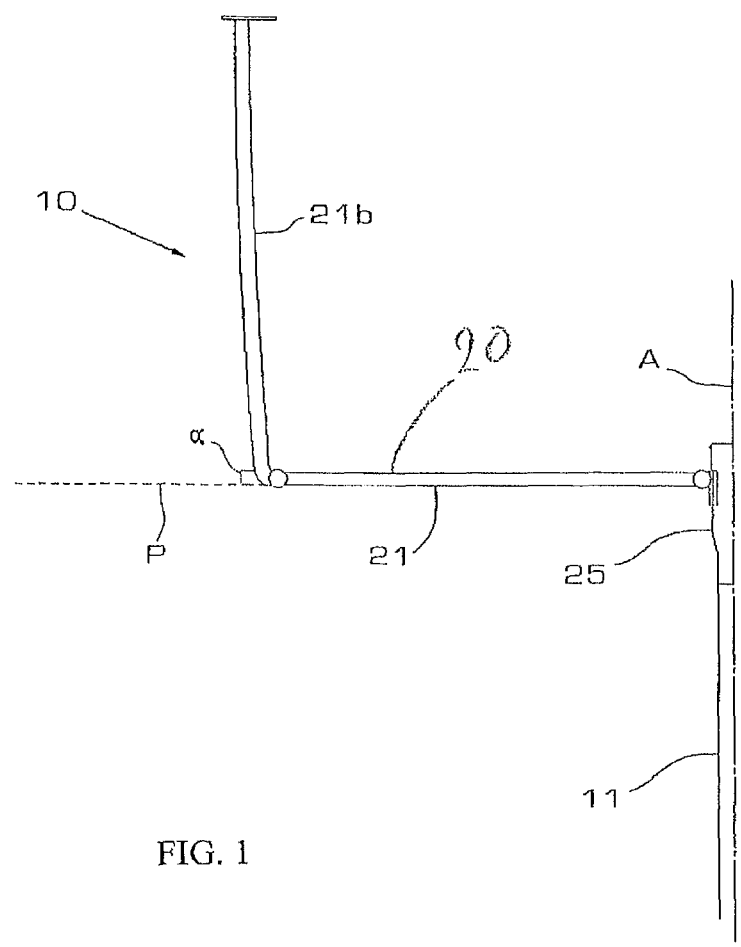
FIG. 1 shows parts of a vertical axis wind power generator with a turbine rotor blade arrangement according an embodiment of the present invention when positioned in an active position.

FIG. 1 shows parts of a vertical axis wind power generator 10. The vertical axis wind power generator 10 generates electricity using the wind as a renewable power source. The vertical axis wind power generator 10 comprises a turbine rotor blade arrangement 20 which upon rotation around a vertical axis A, here illustrated with a dashed line, cooperates with a generator to provide electricity. The wind power generator 10 can be used on vehicles such as boats, campers, trucks, on structures such as houses, masts, chimneys, or optionally or additionally be portable and be positioned at a desired location temporarily or permanently.

Figure 2:
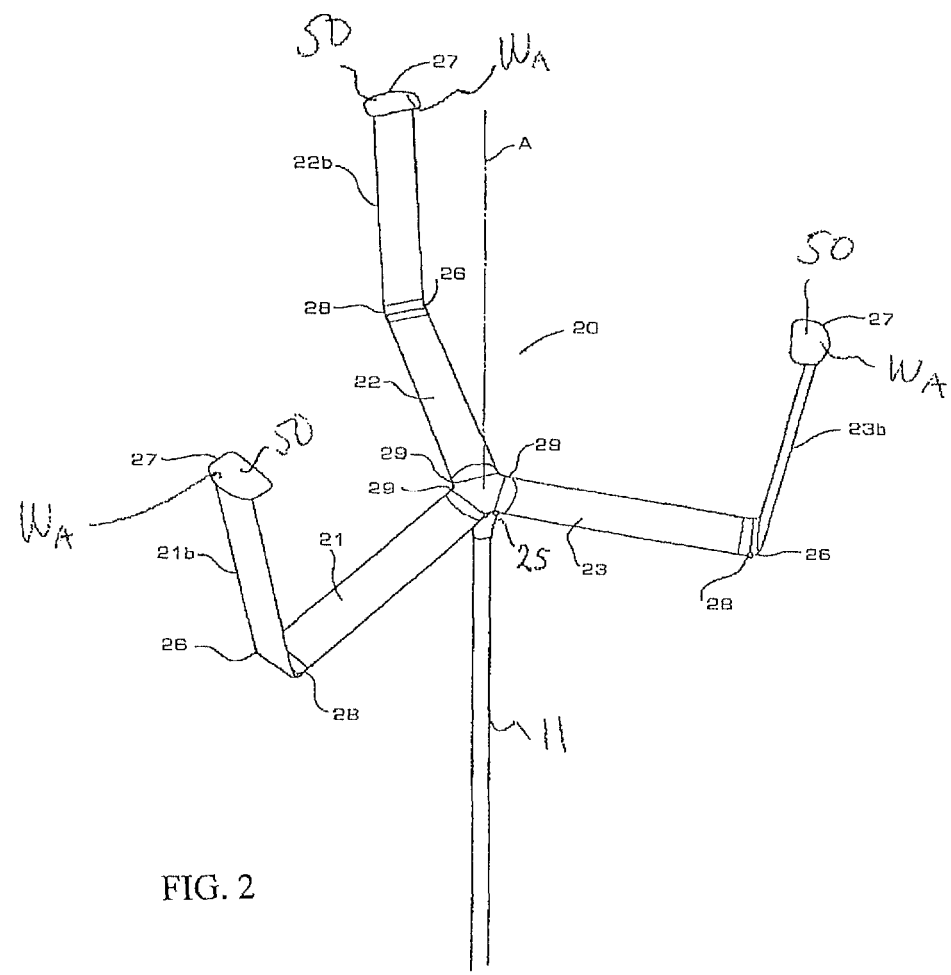
FIG. 2 shows the turbine rotor blade arrangement from FIG. 1 in perspective.
Figure 3A:
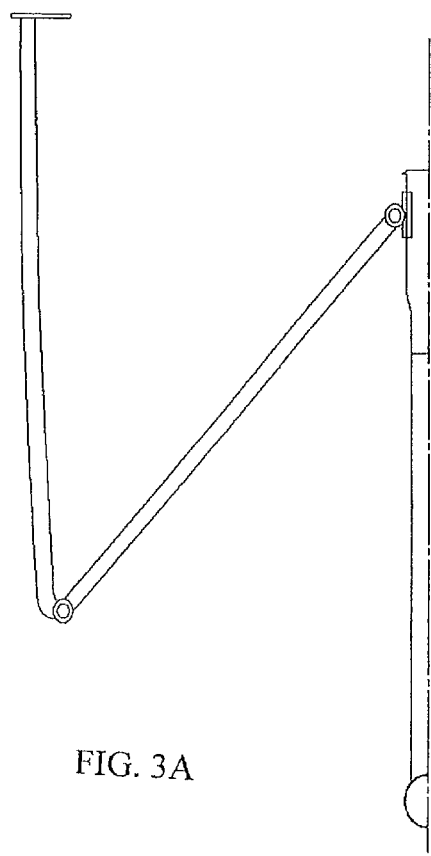
FIGS. 3a-3b show the turbine rotor blade arrangement when being displaced between the active position to the retracted position.
Figure 3B:
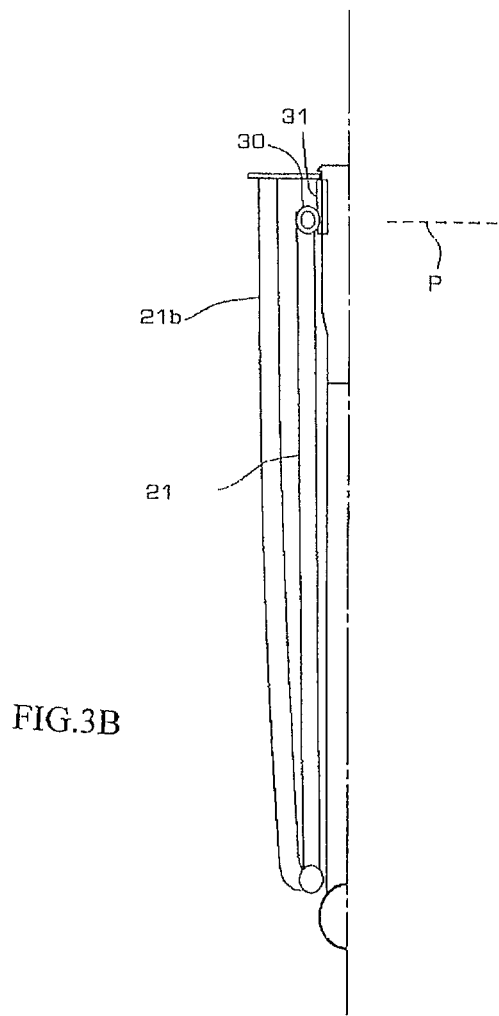

The turbine rotor blade arrangement 20 is shown in an active position, i.e. in a position in which it can rotate and generate power. FIG. 2 shows the turbine rotor blade arrangement in the active position and in perspective. The turbine rotor blade arrangement 20 is arranged on a pole 11 which can be telescopic as will be described below. The turbine rotor blade arrangement 20 can further be retracted to a retracted position as illustrated in FIG. 3b. In the retracted position, the turbine rotor blade arrangement 20 does not generate power and is substantially prevented from rotating as substantially no wind can impart a force to the rotor blades. Although it is possible for it to rotate, in practice, it cannot be efficiently rotated by the wind.

Turning to FIGS. 1 and 2, the turbine rotor blade arrangement 20 has three pivot arms 21, 22, 23 each pivotally connected to a turbine rotor blade 21b, 22b, 23b and pivotally connected to a base member 25. The pivot arms 21, 22, 23 define a horizontal plane P when the rotor blades 21b, 22b, 23b are in the active position.

It should be noted however that it is within the boundaries of the present invention that there can be more than three pivot arms; 4, 5, 6 or more pivot arms for example, each pivot arm connected to a turbine rotor blade. Features will be described below with reference to one pivot arm and one turbine rotor blade only of the turbine rotor blade arrangement 20 for the sake of simplicity. It should be noted however that the described features are applicable to all the pivot arms and turbine rotor blades.

The turbine rotor blade arrangement 20 comprises a base member 25 which is adapted to transfer a torque to the pivot arms 21, 22, 23 and to the rotor blades 21b, 22b, 23b, to thereby move the turbine rotor blade arrangement 20 between the retracted position, shown in FIG. 3b, to the active position, shown in FIGS. 1-2. During the displacement between the active position and the retracted position, the turbine rotor blades 21b, 22b, 23b are substantially vertical throughout the displacement, in this case substantially parallel with the vertical axis A and the pole 11 to which the base member 25 is arranged. This is achieved using a torque transfer arrangement. In this case a rotatable elongated member 40, preferably a rotatable shaft arrangement 41 which will be described in greater detail with reference to FIGS. 4-6. By using a torque transfer arrangement a torque can be transferred from the base member to the pivot arm, thus raise the pivot arms 21, 22, 23 from the retracted position to the active position, while maintaining the rotor blades 21b, 22b, 23b in a vertical position.

With reference to FIG. 2, each turbine rotor blade 21b, 22b, 23b has a first and a second end 26, 27. Each pivot arm has a first and a second end 28, 29. The first ends 26 of the turbine rotor blades 21b, 22b, 23b are pivotally connected to the first ends 28 of the pivot arms 21, 22, 23. The second ends 29 of the pivot arms 21, 22, 23 are pivotally connected to the base member 25. When the rotor blades 21b, 22b, 23 are in the active positions, the rotor blades 21b, 22b, 23 and the pivot arms 21, 22, 23 thus has an L-form.

Further, each second end 27 of the rotor blades 21b, 22b, 23b can advantageously comprise a winglet 50. Winglets 50 have been found to be specifically advantageous as they reduces the turbulence around the second end 27 of the rotor blades 21b, 22b, 23b. and thus improves the efficiency of the reduces the vertical axis turbine rotor blade arrangement 20.

In an embodiment, the winglet has an area $W_A$, as seen along the first direction in FIG. 2, which is 100% larger than the cross section of the rotor blade. Advantageously the winglet area is between 100%-1000%, preferably 200%-800% larger than the cross section of the rotor blade.

An effective length of the pivot arms 21, 22, 23 has been found to be between 0.5-5 meters, preferably 0.5-2 m, more preferably between 0.5-1.5 m. Each pivotally connected turbine rotor blade 21b, 22b, 23b is advantageously between 2-15% longer than the length of the pivot arm 21, 22, 23 to make proper space for the winglets 50, preferably between 3-10% longer.

Figure 4:
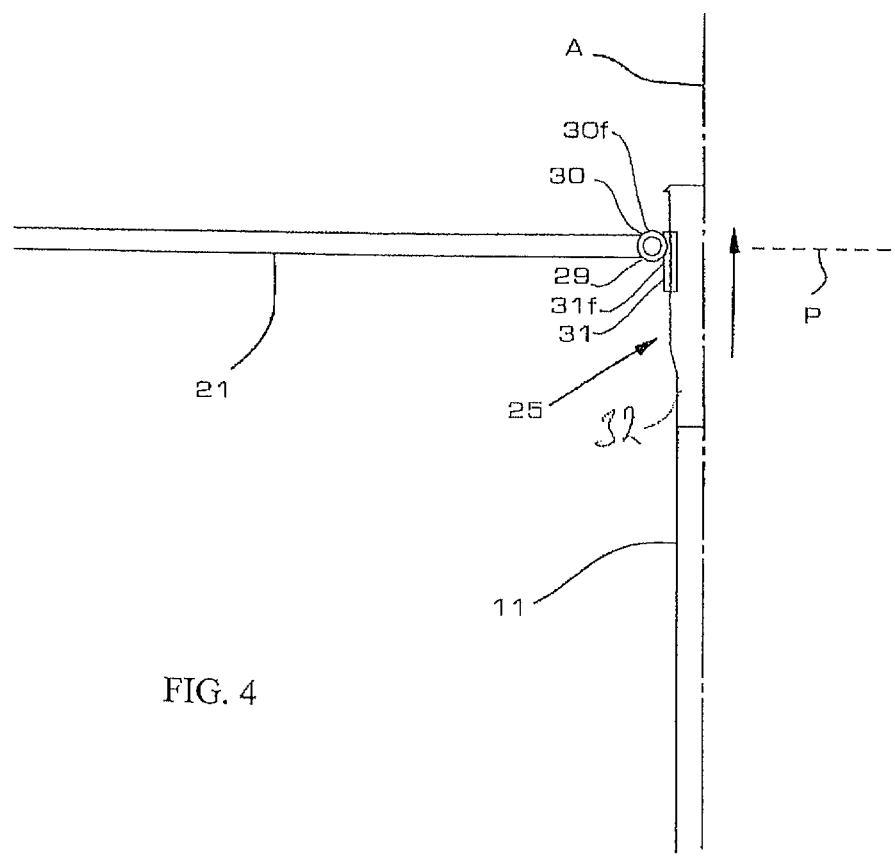
FIG. 4 shows parts of the base member and the pivot arm of the turbine rotor blade arrangement in FIG. 1, when the turbine rotor blade arrangement is in the active position.

FIG. 4 shows parts of a pivot arm 21 pivotally connected to the base member 25 of the turbine rotor blade arrangement 20 in greater detail. In FIG. 4 the turbine rotor blade arrangement 20 is in the active position, as can be seen by the substantially horizontal pivot arm 21 extending along the horizontal plane P. A friction surface, in this case a gear surface, in the form of a gear wheel 30 is arranged at the second end 29 of the pivot arm 21. The gear wheel 30 is in the shown embodiment fixed from rotation with respect to the pivot arm 21 as this provides for a simple yet robust solution. In the shown embodiment, the gear wheel 30 is arranged to the pivot arm as a separate gear wheel, however, it is within the boundaries of the present invention that the second end 29 of the pivot arm has a gear wheel like surface, e.g. as an integrated part of the pivot arm 21 or as a separate attached surface material.

The base member 25 comprises a cooperative friction surface, a gear member 31, in this embodiment a straight gear track, arranged on a displaceable member 32. The displaceable member 32 is in this case a displaceable sleeve which is adapted to be in working cooperation with all the pivot arms 21, 22, 23. The gear member 31 could however be a gear wheel for example. As a part of the base member 25 is displaced along the vertical axis A between a first and a second position in the direction indicated by the arrow in FIG. 4, the gear member 31 imparts a torque to the pivot arm 21 which displaces the pivot arm 21 from the activated position to the retracted position.

In practice it can be that gravity forces the pivot arm 21 to the retracted position and that the gear member 31 is arranged to retain the pivot arm 21 in the activate position as a locking arrangement. During displacement, the gear member 31 permits the displacement between the active position and the retracted position in a smooth and controlled manner. The first position of the displaceable member 32 of the base member 25 is equivalent with the active position and shown in FIG. 4, and the second position of the displaceable member 32 of the base member 25 is equivalent with the retracted position as shown in FIG. 3b.

Figure 5:
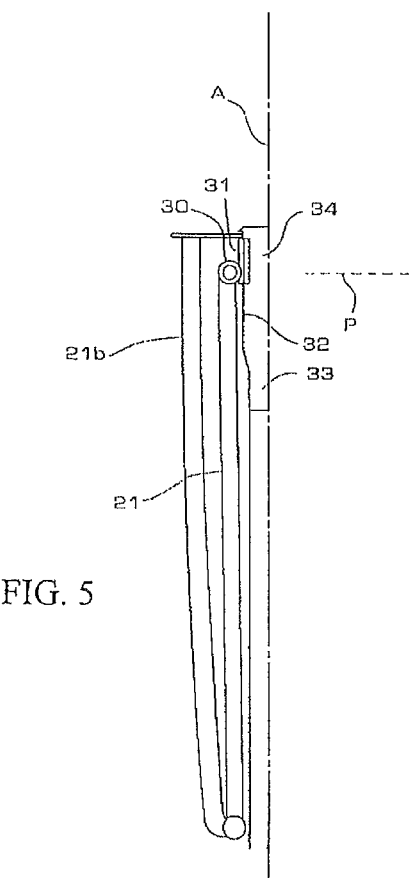
FIG. 5 shows parts of the base member and the pivot arm of the turbine rotor blade arrangement in FIG. 1, when the turbine rotor blade arrangement is in the retracted position.

FIG. 5 shows the base member 25 in the second position. As is noticed, the displaceable member 32 has been displaced so as to retract the pivot arm 21. The pivot arm 21 is in FIG. 5 substantially vertical, i.e. substantially parallel with the vertical axis A. The displaceable member 32 is rotatably arranged around a generator 33. As the turbine rotor blade arrangement 20 rotates due to the wind, the generator 33 generates electrical power which can be distributed to a power grid, locally or remote, for example. The base member 25 can thus comprise a generator 33. In cases where the displaceable member 32, or displaceable members if several are present, comprises magnets, the magnets are effectively inactivated from operation when the displaceable member 32 is moved to the second position.

Figure 6:
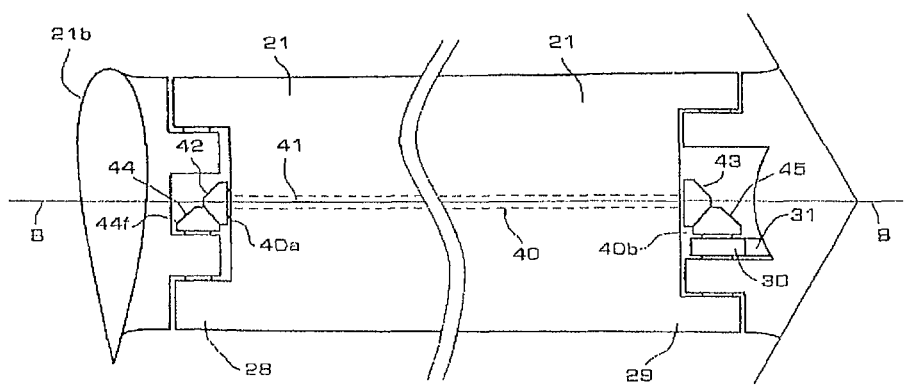
FIG. 6 shows parts of the base member, pivot arm and rotor blade of the turbine rotor blade arrangement in FIG. 1.

FIG. 6 shows parts of the turbine rotor blade arrangement 20 seen from above and partly transparent. As mentioned, to move the pivot arm 21, and thus the turbine rotor blade arrangement 20 between the retracted position to the active position, a torque is imparted via the gear member 31 and the gear wheel 30 to the pivot arm 21.

A rotatable elongated member 40, in this case a rotatable shaft (hereafter referred to as the shaft), is adapted to transfer the torque imparted from the displaceable member 32 of the base member 25 to the rotor blade 21b shown in a cross section in FIG. 6. The elongated member 40 is in this case a shaft 41 comprising bevel gears 42, 43. In the shown embodiment, a first bevel gear 42 is arranged at a first end of the shaft 41 and a second bevel gear 43 is arranged at a second end of the shaft 41. The shaft 41 extends substantially the length of the pivot arm 21 so that the first bevel gear 42 is arranged at the first end 28 of the pivot arm 21 and the second bevel gear 43 is arranged at the second end 29 of the pivot arm 21. The shaft 41 can extend inside of the pivot arm 21 or optionally it can be arranged on the outside of the pivot arm 21. As is noted the pitch angle of the bevel gear is 90°, although between 60-110° is possible.

The first bevel gear 42 is arranged in working cooperation with a rotor blade bevel gear 44 arranged at the rotor blade 21b, as preferably at the second 29 of the rotor blade 21b. The rotor blade bevel gear 44 is fixed with respect to the rotor blade 21b. A pivot arm bevel gear 45 is arranged in close proximity of the gear wheel 30 at the second end 29 of the pivot arm 21. The pivot arm bevel gear 45 is fixed with respect to the friction surface, in this case the gear wheel 30, of the pivot arm 21. In the shown embodiment, the pivot arm bevel gear 45 is attached directly on the gear wheel 30. Both the pivot arm bevel gear and the gear wheel 30 rotates around the same axis, in the shown embodiment, the axis is the same as the pivot axis of the pivot arm 21.

As the displacement member 32 is displaced, the gear member 31 will imparted a torque to the gear wheel 30 which will be transferred to the rotor blade 21b via the shaft arrangement 40 and keep the rotor blade 21b in a vertical position during movement between the retracted position and the active position of the turbine rotor blade arrangement 20 as the pivot arm 21 pivots with respect to the rotor blade 21b and the pole 11.

Figure 7:
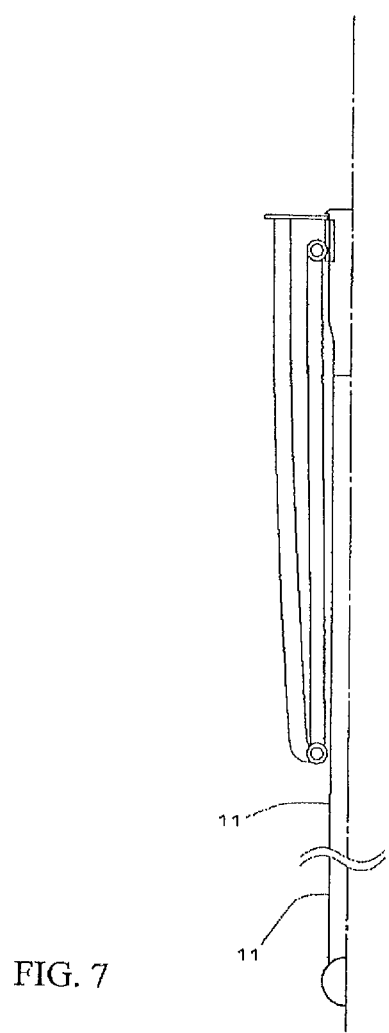
FIGS. 7-9 show a wind power generator having a turbine rotor blade arrangement as shown in FIG. 1 in the retracted position and during different stages of deployment.
Figure 8:
Figure 9:
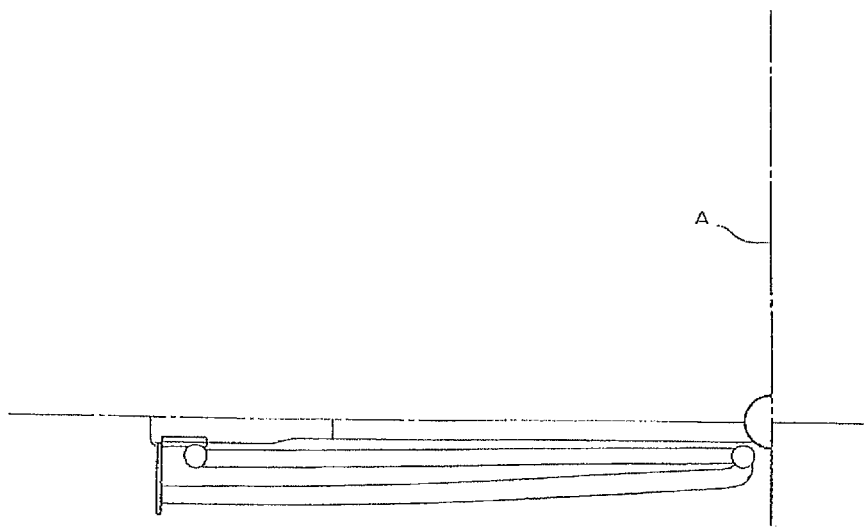

As mentioned, the pole 11 can be telescopic. FIGS. 7-9 show how the pole 11 can be telescopically retracted and further be pivotally connected at the structure or vessel at which is intended to be positioned. As shown in FIG. 9, the turbine rotor blade arrangement 20 can also be tilted with respect to the vertical axis A, to be positioned adjacent the underlying surface, e.g. the ground or the roof of a vehicle for example.

As is noted, the turbine rotor blade arrangement 20 is foldable. It can be positioned in an active position, as shown in FIG. 1 for example, and a retracted position, as shown in FIG. 3b for example. By retracting the turbine rotor blade arrangement 20, the turbine rotor blade arrangement 20 becomes less space consuming. Instead the rotor blades 21b, 22b, 23b are arranged in a neat small package. Should the vertical axis wind power generator 10 be positioned on the roof of a building and a storm is coming, the vertical axis wind power generator 10 can effectively be retracted and thus less exposed to bad weather.

The invention claimed is:

1. A vertical axis turbine rotor blade arrangement for a wind power generator adapted to rotate around a vertical axis and comprising
   a rotor blade having a first and a second end and being pivotally connected to a pivot arm, said pivot arm having a first and a second end and being pivotally connected to a base member,
   said rotor blade is adapted to be displaced between an active position and a retracted position, said base member and said pivot arm defining a horizontal plane when said rotor blade is in said active position, said base member further being rotatable around a pole configured to extend in a first direction below said plane,
   wherein only said first end of said rotor blade is pivotally connected at said first end of said pivot arm and wherein said second end of said pivot arm is pivotally connected to said base member, so that when said rotor blade is in said active position, said rotor blade extends out and away from said plane in a direction substantially opposite of said first direction, above the pole and the base member, wherein said rotor blade and said pivot arm connected thereto has an L-form when said rotor blade is in said active position.

2. The vertical axis turbine rotor blade arrangement according to claim 1, wherein said base member comprises a displaceable member adapted to impart a torque to said pivot arm and said rotor blade simultaneously via a torque transfer arrangement, thereby enabling said displacement of said rotor blade between said active position and said retracted position.

3. The vertical axis turbine rotor blade arrangement according to claim 2, wherein said torque transfer arrangement comprises a rotatable elongated member having a longitudinal centre line and adapted to rotate around its longitudinal centre line for transferring said torque from said base member to said rotor blade.

4. The vertical axis turbine rotor blade arrangement according to claim 3, wherein said rotatable elongated member comprises at least one bevel gear for transferring said torque.

5. The vertical axis turbine rotor blade arrangement according to claim 3, wherein said rotatable elongated member is a rotatable shaft, preferably a rigid shaft.

6. The vertical axis turbine rotor blade arrangement according to claim 3, wherein at least a part of said rotatable elongated member is arranged inside of said pivot arm.

7. The vertical axis turbine rotor blade arrangement according to claim 6, wherein said rotatable elongated member comprises a first and a second end, each comprising a bevel gear for transferring said torque.

8. The vertical axis turbine rotor blade arrangement according to claim 7, wherein substantially only said bevel gears, are arranged outside of said pivot arm.

9. The vertical axis turbine rotor blade arrangement according to claim 2, wherein said torque transfer arrangement comprises a first surface on said pivot arm, said first surface of said pivot arm being fixed with respect to said pivot arm from movement and adapted to cooperate with a surface of said displaceable member of said base member to impart said torque.

10. The vertical axis turbine rotor blade arrangement according to claim 9, wherein said surface of said pivot arm is at least partly formed by a gear wheel.

11. The vertical axis turbine rotor blade arrangement according to claim 7, wherein said torque transfer arrangement comprises a surface on said pivot arm arranged in working cooperation with said bevel gear at said second end of said rotatable elongated member.

12. The vertical axis turbine rotor blade arrangement according to claim 3, wherein said torque transfer arrangement comprises a first surface on said rotor blade, said first surface of said rotor blade being fixed with respect to said rotor blade from movement and adapted to cooperate with said rotatable elongated member to transfer said torque.

13. The vertical axis turbine rotor blade arrangement according to claim 12, wherein said surface of said rotor blade is at least partly formed by a bevel gear.

14. The vertical axis turbine rotor blade arrangement according to the claim 13, wherein said bevel gear of said rotor blade is arranged in working cooperation with a bevel gear at said first end of said rotatable elongated member.

15. The vertical axis turbine rotor blade arrangement according to claim 1, wherein said base member comprises a generator.

16. The vertical axis turbine rotor blade arrangement according to claim 1, wherein said base member is arranged with a telescopic pole.

17. The vertical axis turbine rotor blade arrangement according to claim 1, wherein said turbine rotor blade arrangement comprises 3 or more pivot arms each having a rotor blade.

18. The vertical axis turbine rotor blade arrangement according to claim 2, wherein said displaceable member of said base member is adapted to impart a torque to a plurality of pivot arms and rotor blades.

19. The vertical axis turbine rotor blade arrangement according to claim 1, wherein said rotor blade is longer than said pivot arm.

20. The vertical axis turbine rotor blade arrangement according to claim 19, wherein a second end of said rotor blade comprises a winglet.

* * * * *